May 6, 1958  R. A. WITTREN  2,833,253

POWER STEERING FOR VEHICLES

Filed June 13, 1955

*INVENTOR.*
R. A. WITTREN

United States Patent Office 2,833,253
Patented May 6, 1958

2,833,253

POWER STEERING FOR VEHICLES

Richard A. Wittren, Cedar Falls, Iowa, assignor to Deere Manufacturing Co., Dubuque, Iowa, a corporation of Iowa Application June 13, 1955, Serial No. 515,178

5 Claims. (Cl. 121—41)

This invention relates to power steering for vehicles and more particularly to a steering system utilizing a fluid-transfer device operative optionally as a pump or a motor, according to whether the steering system functions manually or by power.

The basic design of any acceptable fluid-pressure-operating power steering system requires the use of a fluid pressure circuit energized and de-energized by a control valve manipulated in the first instance by the vehicle steering wheel or equivalent steering member. The system should include follow-up or servo means to prevent over-steering, and considerations of safety require that the system include some provision for steering the vehicle in the event of failure of the power-operated fluid supply means.

According to the present invention, all of these features, as well as others, are available in a power steering system including a power-operated pump, a steering motor, a control valve and a fluid-transfer device in the form of a fluid flow meter connected in such manner that steering is initially accomplished by actively positioning the valve under the influence of the vehicle steering wheel and return of the valve to neutral is influenced by operation of the fluid-transfer device as the fluid flows therethrough in proportion to the extent of operation of the steering motor. It is an object of the invention to provide an improved valve means for routing the fluid flow selectively in opposite directions through the fluid-transfer device. The invention has for a further object the arrangement in compact manner of the valve housing, fluid-transfer device and steering shaft.

The foregoing and other important objects and desirable features inherent in and encompassed by the invention will become apparent as a preferred embodiment of the invention is disclosed in detail in the following specification and accompanying sheets of drawings, the several figures of which will be described immediately below.

Figure 1:
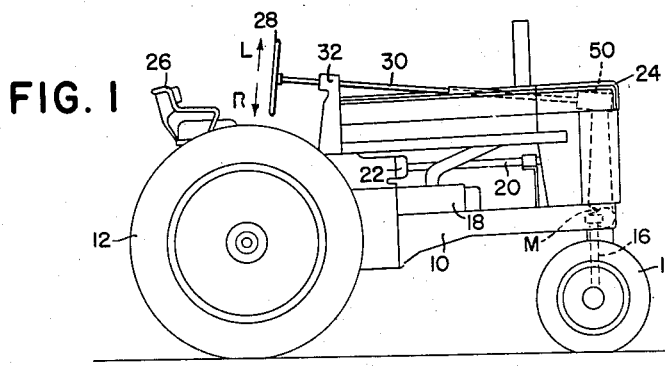
Fig. 1 is an elevational view of a typical agricultural tractor, representing a vehicle to which the present power steering system may be applied.

The vehicle chosen for the purposes of illustration comprises a well known form of agricultural tractor having a main body 10 conventionally supported at its rear on one or more traction wheels 12 and supported at its front end by steerable wheel means 14 steerable about an upright axis as represented by a shaft or spindle 16. The tractor body 10 carries a power source in the form of an internal combustion engine 18 having an engine-fan-driving shaft 20 driven by mechanism (not shown) such as that in the U. S. patent to McCray 1,848,260. The fan shaft 20 serves here as means for driving a main pump or fluid supply means 22, which may be of the constant-pressure type.

The tractor is shown as including such other readily recognizable conventional parts as a combination engine hood and grill structure 24, an operator's seat 26, a steering wheel 28, and a steering member in the form of a steering shaft 30 connected to the steering wheel 28 and journaled in a rear mount 32 on the tractor.

The upright shaft or spindle 16 of the steerable wheel means 14 may be turned about its axis to steer the wheel means to the right or to the left by means of a bidirectional steering motor M under control of a valve means V that is initially moved to one of two active positions by the steering wheel 28 and that is automatically returned to neutral by the action of a fluid-transfer device or fluid flow meter F. The directions of movements of the various parts according to the directions of steering are appropriately indicated by arrows labeled L and R standing respectively for "left" and "right."

The fluid motor M comprises a cylinder 34 having opposite ends 36 and 38 and carrying a piston 40 which has opposite ends 42 and 44. The piston is provided intermediate its ends with a toothed or rack portion 46 that is in constant mesh with a pinion 48 keyed to the steerable wheel means spindle 16.

The control valve means V comprises a support or housing 50 having a valve bore 52 in which is carried for both angular and axial movement a spool valve 54 of the closed-center type. The valve housing includes a plurality of passages, including a supply inlet 56, a pair of motor passages 58 and 60, an exhaust passage 62, and a pair of additional passages 64 and 66 for controlling the supply of fluid to and from the fluid-transfer device F, as will presently appear. The supply inlet 56 is connected across the right-hand end of the valve bore 52 by means of a check valve chamber 68 in which a check valve ball 70 is normally closed by a spring 72. During normal operation, fluid under pressure is supplied from the pump 22 via a pump line 76 directly to the valve bore 52 via the inlet 56, since the check valve 70 is closed. As already stated, the pump 22 may be of the constant-pressure type. The motor passages 58 and 60 are connected by lines 78 and 80 respectively to the ends 38 and 36 of the motor M.

Figure 2:
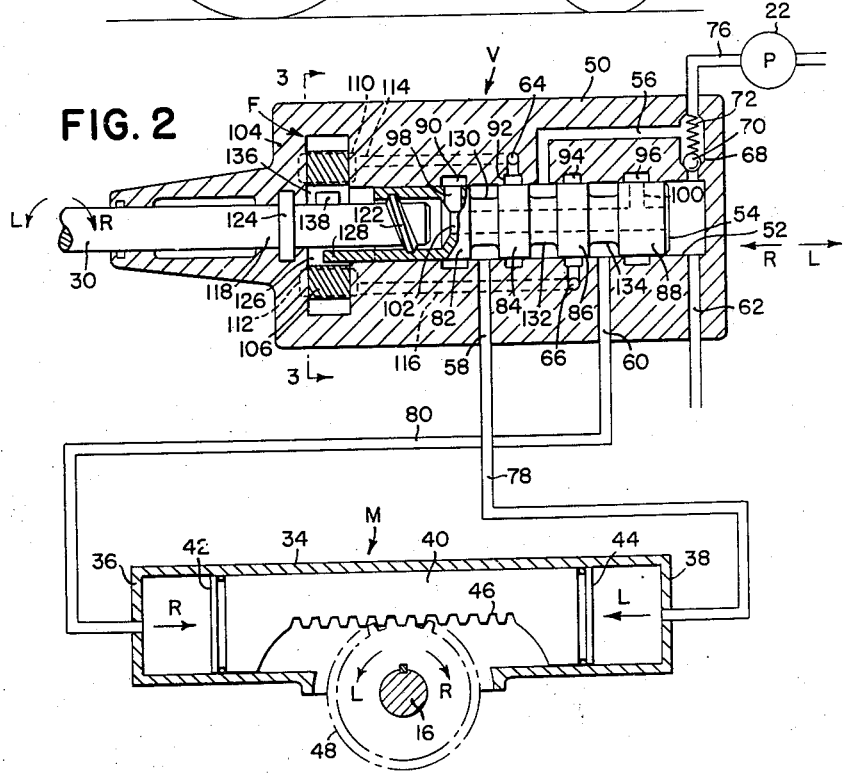
Fig. 2 is a schematic view, partly in section, showing the hydraulic circuit and the control therefor.

The valve member 54 has a plurality of axially spaced lands 82, 84, 86 and 88 which, when the valve member is in its neutral position as shown in Fig. 2, respectively block annular grooves 90, 92, 94 and 96 formed in the valve housing concentrically with the valve bore 52. The grooves 92 and 94 are respectively in register with the fluid-transfer device passages 64 and 66. When the valve member 54 is in its neutral position, the grooves 90 and 96 are respectively in register with radial passages 98 and 100 formed in the valve member 54 and communicating with an axial valve member bore 102.

The fluid-transfer device or flow meter F comprises a rotor housing 104, here shown as being integral with the valve housing 50. The rotor housing contains a pair of rotors or rotary parts, here in the form of intermeshing gears 106 and 108, and this housing further has a pair of fluid ports 110 and 112 alternately serviceable as intake or discharge ports, depending upon the direction of fluid flow through the device. These ports are connected to the passages 64 and 66 by passages 114 and 116, respectively.

The steering shaft 30 has a coaxial actuating shaft extension 118 on which the rotor or gear 106 is coaxially mounted for limited relative angular movement and with which the valve member 54 is coaxial. The other gear or rotor 108 is carried on an idler shaft 120 appropriately carried in the rotor housing 104. The steering shaft extension 118 and the valve member 54 are reversibly interconnected by helical means 122 so that, if the valve member 54 is held against angular movement, rotation of the steering shaft 30 to the right will cause the valve member 54 to move axially to the rear (to the left in Fig. 2), and vice versa. The helical connection at 122 also operates to enable reverse axial shifting of the valve member 54 if the steering shaft 30 is held against angular movement and the valve member 54 is moved angularly. The shaft extension 118 has fixed thereto a collar 124 which engages the housing 104 to hold the shaft against axial displacement.

The means for interconnecting the gear or rotor 106 of the flow meter F and the valve member 54 so that the valve member may be optionally moved angularly or held against angular rotation comprises a keyway 126 in the rotor member and a cooperating tang or key 128 on the valve member. Since the rotor 106 is closely confined to the rotor housing 104, it is held against axial displacement relative to the valve member 54. The tang or key 128 is received in the keyway 126 in such manner as to permit axial movement of the valve member relative to the rotor. However, the connection at 126—128 affords means whereby the rotor and valve member may move angularly in unison. It will thus far appear that when the valve member 54 is in its neutral position, fluid is locked in the flow meter F as well as in the circuit between the valve member 54 and the motor M. Because of the fluid or hydraulic lock on the gears or rotors 106 and 108, the rotors are fixed. Consequently, the angular position of the valve member 54 is fixed so that if the steering shaft 30 is rotated in one direction or the other, consequent axial movement of the valve member 54 will result, displacing the valve member axially from the neutral position of Fig. 2 to either of two active positions, one axially at either side of that neutral position so that annular grooves 130, 132 and 134 in the valve member and respectively separating the lands 82, 84, 86 and 88 may cooperate with the passages and grooves in the valve housing, as will appear below.

Figure 3:
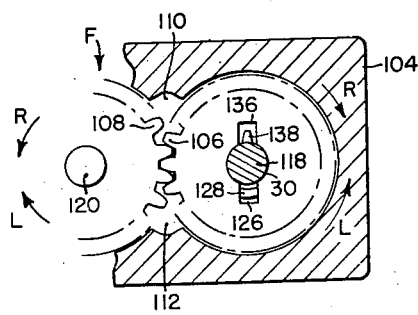
Fig. 3 is a fragmentary sectional view taken on the line 3—3 of Fig. 2.

The invention features a driving connection between the steering shaft extension 118 and the rotor or gear 106, thus enabling operation of the flow meter F as a pump as well as a motor. This driving connection comprises a keyway 136 in the rotor 106 and a key 138 in the shaft extension 118. As best seen in Fig. 3, the angular dimension of the key 138 is materially less than that of the keyway 136, thus affording limited relative angular movement between the shaft extension and the rotor. After the lost motion has been taken up, the key serves as means whereby the shaft extension 118 may drive the rotors selectively in either angular direction.

*Operation*

Let it be assumed that the vehicle is operating straight ahead with the pump 22 power-source-driven in the manner previously described and with the valve member 54 in its neutral position as shown in Fig. 2. The valve member blocks the several passages and grooves so that the motor and the flow meter are hydraulically locked.

If the operator turns the steering wheel 28 and shaft 30 to the right (arrow R in Fig. 1 and at the left-hand side of Fig. 2), the valve member 54 will be held against angular movement because of the fluid lock in the flow meter F. Because of the lost motion in the driving connection 136—138 between the steering shaft extension 118 and the flow meter gear 106, limited angular movement of the shaft extension 118 is permitted. Accordingly, the helical means 122 will serve to cause movement of the valve member 54 to the rear or in the direction of the arrow R at the right-hand side of Fig. 2. When the valve shifts in the manner just described, the valve member groove 132 interconnects the supply inlet 56 and the groove 92 so as to cause fluid to flow through the flow meter passage 64—114 to the flow meter upper port 110. Simultaneously with the interconnection of the supply inlet 56 and flow meter port 110 when the valve member 54 is shifted to the rear, a connection is effected between the flow meter lower port 112 and the motor passage 60 via the passage 116—66 valve member groove 134. Now, as fluid enters the flow meter port 110, it causes the gears 106 and 108 to rotate outwardly away from each other or in the directions of the arrows R in Fig. 3, and fluid flowing through the flow meter, which is now operating as a motor, exits from the flow meter lower port 112, following the passasge 116—66—134—60 to the motor line 80 and thence to the left-hand end 36 of the motor M, causing the motor piston 40 to move to the right or in the direction of the arrow R at the left-hand end of the motor in Fig. 2. Thereupon, the rack and pinion means causes rotation of the steerable wheel means spindle 16 in a clockwise or right-hand direction. The moment that the operator ceases to turn the steering wheel, the steering shaft 30 and shaft extension 118 become stationary and the driving of the flow meter gears 106 and 108 by fluid flowing therethrough to the motor via the motor line 80 causes the flow meter gear 106 to follow or catch up to the shaft extension 118, again centering the keyway 136 on the shaft extension key 138. As the flow meter gear 106 rotates, and since it rotates in the same direction as the initial turning of the steering wheel, it operates through its drive connection 126—128 to the valve member 54 to turn the valve member angularly relative to the now stationary shaft extension 118. Axial movement of the valve member will therefore be reversed and it will return to its neutral position, again cutting off flow through the flow meter to the motor and hydraulically locking the flow meter and motor M so that the steerable wheel means remains in the position to which it was initially steered. If the operator resumes or continues turning the steering shaft 30 to the right, the fluid flow through the flow meter F resumes or continues to drive the gear 106 in the same direction and the valve member 54 is kept in its active position until turning of the steering shaft 30 stops, after which the valve member 54 is servo-returned by the flow meter to its neutral position in the manner previously described.

During steering of the vehicle to the right in the manner outlined above, shifting of the valve member 54 to the rear to its one active position connects the right-hand end 38 of the motor M to the exhaust line 62 via the motor line 78, motor passage 58, valve member groove 130, valve housing groove 90 and valve member bores 98 and 102.

To accomplish a left turn, the steering shaft 30 is turned in a counterclockwise direction or in the direction of the arrow L at the left-hand end of Fig. 2. The helical means 122 thus operates to cause the valve member 54 to shift to the front or in the direction of the arrow L at the right-hand end of Fig. 2, the valve member 54 being held against angular movement by the fluid-locked flow meter F. Again, lost motion at 136—138 permits turning of the shaft extension 118 relative to the gear 106 so as to effect axial shifting of the valve member. As the valve member shifts to its second active position, the valve member groove 132 interconnects the supply inlet 56 and the valve housing groove 94 which, as previously described, is in register with the flow meter passage 66—116, whereupon fluid under pressure is introduced to the flow meter lower port 112 to cause the flow meter gears 106 and 108 to rotate inwardly toward each other in the directions of the arrows L in Fig. 3, the fluid flowing around the gears and exiting at the upper flow meter port 110 and flowing thence along the passage 114—64 to the valve housing groove 92. This groove is now uncovered by the land 84 and is connected across the valve bore 52 by the valve member groove 130 so that fluid enters the motor passage 58 and flows thence via the motor line 78 to the right-hand end 38 of the motor M, acting on the right-hand end 44 of the piston 40 to cause the piston to move to the left or in the direction of the arrow L, the rack and pinion means causing counter-clockwise turning of the steerable wheel means spindle 16 to effect a left turn of the vehicle. The follow-up or servo action on the valve is accomplished by the rotation of the flow meter gear 106 by the fluid flowing through the meter, the relationship of the lost motion means 136—138 accomplishing the same results as previously described for the right-hand turn, with the exception that the directions will be reversed.

One of the significant features of the invention is the optional use of the flow meter or fluid-transfer device F as a pump to operate the steering system in the event of failure of the power-source-driven pump or supply means 22. In explanation of this, it will be assumed that for one reason or another the pump 22 is inactive and therefore incapable of supplying fluid under pressure to the system. In that event, initial turning of the steering shaft 30, for example to the right, will, through the helical connection 122, cause shifting of the valve member 54 to the rear, as for a right-hand turn as previously described. However, since the pump 22 is now idle, no fluid under pressure will be introduced to the flow meter via the port 116. Instead, as the gears 106 and 108 are manually rotated by the steering wheel in the directions of the arrows R in Fig. 3, they operate as pump gears to carry fluid from the flow meter port 110 to the lower flow meter port 112, which fluid is delivered via the passage means 116, 66, 134 and 60 to the motor line 80 and thence to the left-hand end 36 of the motor M to cause the piston 40 to move to the right and thus to cause angular movement of the steerable wheel means spindle 16 in a clockwise or right-hand direction. Operation of the gear 106 as a pump gear is effected when the lost motion act 136—138 is taken up. In other words, the initial movement of the steering shaft 30 to the right causes shifting of the valve member 54 to the rear without turning the gear 106. However, after the lost motion disappears, the key 138 serves as a driving member engaging the keyway 136 to cause clockwise or right-hand rotation of the gear 106 as already described.

When the valve member 54 shifts to the rear to establish fluid communication between the flow meter lower port 112 and the left-hand end 36 of the motor via the motor line 80 and motor passage 60, it also establishes fluid communication between the port 110 and the fluid inlet 56 via the passage means established at 114, 64, 132, and 56. However, since the pump 22 is idle, the intake action now established by the flow meter when operating as a pump cannot draw fluid from the main pump 22. Nevertheless, this difficulty is avoided by the presence of the check valve 70, which is caused to open because of the lower pressure in the passage 56 as compared to that in the exhaust passage 62. Therefore, fluid returning from the right-hand end of the motor M via the motor line 78, motor passage 58, valve member groove 130, valve housing groove 90 and valve member bores 98 and 102 is drawn past the now opened check valve 70 into the supply inlet 56 to complete the circuit.

Similar results are obtainable by operation of the steering shaft 30 in the opposite or left-hand direction when the pump 22 is idle, in which case initial movement of the steering shaft 30 first causes movement of the valve member 54 to the front or in the direction of the letter L at the right-hand end of Fig. 2. The gears 106 and 108 now rotate inwardly toward each other or in the directions of the arrows L in Fig. 3, causing transfer of fluid from the flow meter lower port 112 to the flow meter upper port 110 and thence via the passages 114, 64, 92, 130 and 58 to the motor line 78 and thence to the right-hand end 44 of the piston 40. At the same time, the active position of the valve member 54 establishes a return passage from the motor line 80 to the exhaust passage 62 via the passages 60, 134, 96, 100 and 102. Again, the check valve 70 will open so that the supply inlet 56 is connected to the return for completing the circuit, since necessary fluid cannot be drawn from the idle pump 22.

The advantages of the availability of the manual operation of the system are believed to be obvious without further elaboration. The optional utilization of the flow meter as a motor or a pump materially simplifies the design and operation of the system. The entire arrangement lends itself to a compact organization involving relatively few movable parts. When the flow meter operates as a motor, it functions as servo means for returning the valve member 54 to neutral. As already described, when the flow meter or fluid-transfer device operates as a pump, it affords manual operation of the system in the event of failure of the power-source-driven pump 22. Various other features and advantages of the invention, as well as modifications and alterations in the preferred embodiment disclosed, will readily occur to those versed in the art, all of which may be achieved without departing from the spirit and scope of the invention.

What is claimed is:

1. In a hydraulic control system: a housing having a valve bore and a flow meter chamber portion at one end of and coaxial with said bore, said chamber having opposite fluid ports and said housing having a pair of passages respectively connecting said ports to the valve bore in axially spaced apart relation, said housing further having a pressure inlet port leading to the bore axially intermediate the flow meter passages and a pair of motor passages leading to the bore respectively at axially opposite sides of the flow meter passages; flow meter means in said chamber including a rotor coaxial with the valve bore and having an axial aperture therein; a valve member axially shiftable in the bore for controlling the aforesaid passages, said valve member having one end proximate to the rotor and including at said end an axial recess in register with the rotor aperture; a control shaft journaled in the housing and having an interior end portion extending loosely through the rotor aperture and into the valve member recess; first key means interconnecting the valve member and rotor for preventing relative angular movement between the two but enabling relative axial shifting of the valve member; means restraining the rotor against axial shifting; means retaining the shaft against axial shifting; second key means interconnecting the rotor and shaft for angular movement in unison but including a lost-motion device enabling limited relative angular movement between said rotor and shaft; and helical means cooperative between the shaft and the axially recessed end of the valve member for shifting the valve member axially upon turning of the shaft relative to the rotor to control the aforesaid passages.

2. The invention defined in claim 1, in which: the first key means includes a slot in the rotor leading radially from the rotor aperture and a tang on the valve member and extending into said slot.

3. In a hydraulic control system: a housing having a valve bore and a plurality of fluid passages leading to said bore; a valve member axially shiftable in the bore for controlling said passages and having an axial recess at one end thereof; flow meter means including a rotor chamber in the housing coaxial with the valve bore at said one end of the valve member and a rotor concentric with said chamber, said chamber having alternately serviceable intake and discharge ports connected to certain of said passages, and said rotor having an axial aperture therethrough in register with the valve member recess; a control shaft journaled in the housing and having an interior end portion extending loosely through the rotor aperture and into the valve member recess; first key means interconnecting the valve member and rotor for preventing relative angular movement between the two but for enabling relative axial shifting of the valve member; means restraining the rotor against axial shifting; means restraining the shaft against axial shifting; second key means interconnecting the rotor and shaft for angular movement in unison but including a lost-motion device enabling limited relative angular movement between said rotor and shaft; and helical means cooperative between the shaft and the axially recessed end of the valve member for shifting the valve member axially upon turning of the shaft relative to the rotor to control the aforesaid passages.

4. The invention defined in claim 3, in which: the first key means includes a slot in the rotor leading radially from the rotor aperture and a tang on the valve member and extending into said slot.

5. In a hydraulic control system: a housing having a valve bore and a plurality of fluid passages leading to said bore; a valve member axially shiftable in the bore for controlling said passages; flow meter means including a rotor chamber in the housing coaxial with the valve bore and a rotor concentric with said chamber, said chamber having alternately serviceable intake and discharge ports connected to certain of said passages, said rotor lying coaxially proximate to one end of the valve member; a control shaft journaled in the housing coaxially with the rotor and valve member; first key means interconnecting the valve member and rotor for preventing relative angular movement between the two but enabling relative axial shifting of the valve member; means restraining the rotor against axial shifting; means restraining the shaft against axial shifting; second key means interconnecting the rotor and shaft for angular movement in unison but including a lost-motion device enabling limited relative angular movement between said rotor and shaft; and helical means cooperative between the shaft and the axially recessed end of the valve member for shifting the valve member axially upon turning of the shaft relative to the rotor to control the aforesaid passages.

References Cited in the file of this patent
UNITED STATES PATENTS

| | | |
|---|---|---|
| 1,872,714 | Farley | Aug. 23, 1932 |
| 2,020,951 | Lemon | Nov. 12, 1935 |
| 2,163,892 | Sanford et al. | June 27, 1939 |
| 2,213,271 | Davis | Sept. 3, 1940 |
| 2,321,377 | French | June 8, 1943 |
| 2,587,495 | MacDuff | Feb. 26, 1952 |
| 2,669,096 | MacDuff | Feb. 16, 1954 |
| 2,707,523 | Sisley et al. | May 3, 1955 |
| 2,710,596 | Folkerts | June 14, 1955 |